(12) United States Patent
Books et al.

(10) Patent No.: US 9,718,454 B2
(45) Date of Patent: Aug. 1, 2017

(54) HYBRID CONTROLS ARCHITECTURE

(71) Applicant: CUMMINS INC., Columbus, IN (US)

(72) Inventors: Martin T. Books, Columbus, IN (US); Vincent Freyermuth, New Brighton, MN (US); Tung-Ming Hsieh, Carmel, IN (US); Praveen Muralidhar, Greenwood, IN (US); Lining Zhou, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/086,084

(22) Filed: Nov. 21, 2013

(65) Prior Publication Data

US 2015/0142229 A1 May 21, 2015

(51) Int. Cl.
*B60L 9/00* (2006.01)
*B60L 11/00* (2006.01)
(Continued)

(52) U.S. Cl.
CPC ............ *B60W 20/10* (2013.01); *B60W 10/06* (2013.01); *B60W 10/08* (2013.01); *B60W 10/26* (2013.01);
(Continued)

(58) Field of Classification Search
None
See application file for complete search history.

(56) References Cited

U.S. PATENT DOCUMENTS 6,991,053 B2 1/2006 Kuang et al.
7,024,299 B2 * 4/2006 Hubbard ............... B60L 11/123
180/65.8
(Continued)

FOREIGN PATENT DOCUMENTS

WO 2008025147 A1 3/2008
WO 2009115365 5/2009
(Continued)

OTHER PUBLICATIONS

Kojimoto, Nigel (Nigel C.), Pneumatic battery : a chemical alternative to pneumatic energy storage, Massachusetts Institute of Technology, Senior Thesis, ( http://hdl.handle.net/1721.1/74269) (Jun. 2012) hereinafter "Kojimoto").*
(Continued)

*Primary Examiner* — Jean-Paul Cass
(74) *Attorney, Agent, or Firm* — Taft Stettinius & Hollister LLP

(57) ABSTRACT

Apparatuses, methods and systems for hybrid powertrain control are disclosed. Certain example embodiments control an internal combustion engine and a motor/generator of a hybrid electric powertrain. Example controls may determine a total output demanded of a powertrain based at least in part upon an operator input, a battery output target based upon a battery state of charge and independent of the operator input, and an engine output target based upon the total output demanded and the battery output target. Such example controls may further determine a constrained engine output target, a modified battery output target based upon the total output demanded and the constrained engine output target, and a constrained battery output target based upon the modified battery output target and a battery constraint. Further embodiments, forms, objects, features, advantages, aspects, and benefits shall become apparent from the following description and figures.

32 Claims, 9 Drawing Sheets

(51) Int. Cl.
- *G05D 1/00* (2006.01)
- *G05D 3/00* (2006.01)
- *G06F 7/00* (2006.01)
- *G06F 17/00* (2006.01)
- *B60W 20/10* (2016.01)
- *B60W 10/06* (2006.01)
- *B60W 10/08* (2006.01)
- *B60W 10/26* (2006.01)

(52) U.S. Cl.
CPC . *B60W 2710/244* (2013.01); *B60W 2710/248* (2013.01); *Y02T 10/6286* (2013.01); *Y10S 903/93* (2013.01)

(56) References Cited

U.S. PATENT DOCUMENTS

| | | | |
|---|---|---|---|
| 7,206,687 B1 | 4/2007 | Huseman | |
| 7,305,873 B2* | 12/2007 | Hubbard | B60K 6/445 180/65.8 |
| 7,360,615 B2 | 4/2008 | Salman et al. | |
| 7,398,845 B2 | 7/2008 | Kuang et al. | |
| 8,035,324 B2* | 10/2011 | Heap | B60K 6/26 318/139 |
| 8,047,314 B2* | 11/2011 | Oba | B60K 6/365 180/65.265 |
| 8,061,893 B2* | 11/2011 | Su | G01R 31/343 318/490 |
| 8,073,602 B2* | 12/2011 | Hsieh | B60K 6/445 180/65.21 |
| 8,092,339 B2* | 1/2012 | Heap | B60K 6/445 477/5 |
| 8,121,765 B2* | 2/2012 | Hsieh | B60K 6/26 180/65.265 |
| 8,126,604 B2* | 2/2012 | McGrogan | B60W 30/1846 701/1 |
| 8,135,532 B2* | 3/2012 | Heap | B60K 6/26 180/65.265 |
| 8,191,661 B2* | 6/2012 | Gillecriosd | B60K 6/387 180/65.21 |
| 8,210,296 B2* | 7/2012 | Katsuta | B60K 6/365 180/65.23 |
| 8,463,475 B2* | 6/2013 | Seta | B60L 1/00 180/65.1 |
| 8,464,690 B2* | 6/2013 | Yuille | B60K 6/48 123/350 |
| 8,583,306 B2* | 11/2013 | Arnett | B60W 20/00 180/65.275 |
| 8,639,403 B2* | 1/2014 | Books | B60W 50/00 701/1 |
| 8,880,258 B2* | 11/2014 | Breton | B60W 20/10 701/101 |
| 8,892,330 B2* | 11/2014 | Yuille | B60W 10/06 701/84 |
| 2005/0040789 A1* | 2/2005 | Salasoo | H02J 7/0014 320/119 |
| 2010/0152936 A1 | 6/2010 | Wang et al. | |
| 2010/0305798 A1 | 12/2010 | Phillips et al. | |
| 2012/0059565 A1 | 3/2012 | Kozarekar et al. | |
| 2014/0197841 A1* | 7/2014 | Mizoguchi | G01R 31/3658 324/434 |
| 2015/0222262 A1* | 8/2015 | Hanamura | H02M 7/003 327/109 |
| 2017/0005515 A1* | 1/2017 | Sanders | H02J 3/381 |

FOREIGN PATENT DOCUMENTS

| | | |
|---|---|---|
| WO | 2009259363 | 10/2009 |
| WO | 2010131164 | 5/2010 |
| WO | 2011023228 | 9/2011 |
| WO | 2012232731 | 9/2012 |

OTHER PUBLICATIONS

International Search Report and Written Opinion, ISAUS, PCT/US14/86737, Feb. 23, 2015, 18 pgs.

\* cited by examiner

HYBRID CONTROLS ARCHITECTURE

BACKGROUND

In hybrid vehicle powertrains including more than one power source there may be multiple competing controls objectives that would preferably be met simultaneously. These goals may include providing the total power demanded by the operator and maintaining an optimal reserve of stored energy. In electric hybrid power plants, these goals may further include managing battery usage to extend battery life as it may be one of, if not the most expensive component in the system. A number of additional goals may also be pursued in various applications. The total power generated may be optimized for efficiency both instantaneously and over an operating cycle. Each of the power sources may be governed within respective operating limits. Non-powertrain energy parasitics may be accommodated without affecting the powertrain performance. The continuously changing mix of power sources may be accomplished smoothly to reduce or minimize their perceptibility to the operator. The simultaneous and competing demands imposed by multiple goals present a challenging and complex controls problem. Heretofore a variety of control schemes for hybrid vehicles have been proposed. However, existing approaches suffer from drawbacks and undesirable limitations. For example, many existing approaches are complex and ultimately couple the power-split decision making to the total power demanded by the operator. Such systems have difficulty managing total SOC in different drive cycles, and produce sub-optimal outcomes for energy capture, fuel economy, battery life, and other considerations.

DISCLOSURE

For the purposes of clearly, concisely and exactly describing example embodiments of the invention, the manner and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art to which the invention relates.

SUMMARY

Unique apparatuses, methods and systems for hybrid powertrain control are disclosed. Certain example embodiments control an internal combustion engine and a motor/generator of a hybrid powertrain. Example controls may determine a total output demanded of a hybrid electric powertrain based at least in part upon an operator input, a battery output target based upon a battery state of charge and independent of the operator input, and an engine output target based upon the total output demanded and the battery output target. Such example controls may further determine a constrained engine output target, a modified battery output target based upon the total output demanded and the constrained engine output target, and a constrained battery output target based upon the modified battery output target and a battery constraint. Further embodiments, forms, objects, features, advantages, aspects, and benefits shall become apparent from the following description and figures.

DETAILED DESCRIPTION

Figure 1:
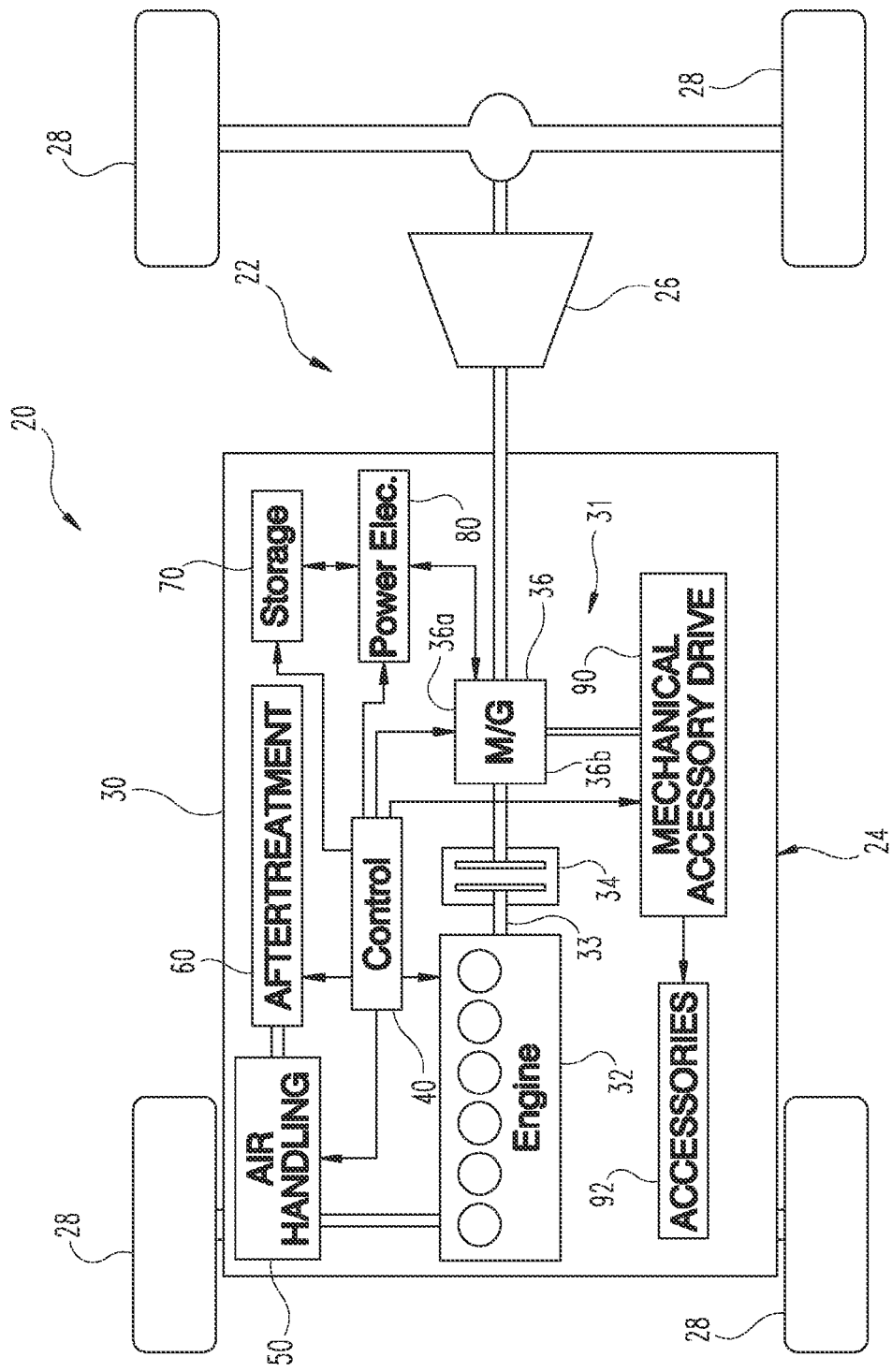
FIG. 1 illustrates a partially diagrammatic view of a vehicle including an example hybrid powertrain.

With reference to FIG. 1 there is illustrated a partially diagrammatic view of a vehicle 20 including an example hybrid powertrain 22. It shall be appreciated that the configuration and components of vehicle 20 and of hybrid powertrain 22 are but one example, and that this disclosure contemplates that a variety of different hybrid vehicles and hybrid powertrain configurations and components may be utilized. Hybrid powertrain 22 includes a hybrid pretransmission hybrid system 24, a transmission 26, and ground engaging wheels 28. Depicted hybrid powertrain 22 systems is a series-parallel hybrid (selectable with clutch 34), although the system may be, without limitation, a parallel configuration, a series configuration, and/or a series-parallel hybrid system.

It should be appreciated that in this embodiment, the propulsion of vehicle 20 is provided by the rear wheels 28; however in other applications front wheel drive and four/all wheel drive approaches are contemplated. In one form vehicle 20 is an on-road bus, delivery truck, service truck or the like; however in other forms vehicle 20 may be of a different type, including other types of on-road or off-road vehicles. In still other embodiments it may be a marine vehicle (boat/ship) or other vehicle type. In yet other embodiments, rather than a vehicle, the hybrid power train 22, including the pretransmission hybrid power system 24 is applied to stationary applications, such as an engine-driven generator (a Genset), a hybrid system-driven pump, or the like to name just a few possibilities.

Pretransmission hybrid system 24 includes hybrid power system 30. System 30 includes internal combustion engine 32, clutch 34, motor/generator 36, controller 40, air handling subsystem 50, aftertreatment equipment 60, electrical power storage device 70, electrical power electronics device 80, and mechanical accessory drive subsystem 90. System 30 is in the form of a parallel hybrid power source 31 such that engine 32 and/or motor/generator 36 can provide torque for power train 22 depending on whether clutch 34 is engaged or not. It should be appreciated that motor/generator 36 can operate as a motor 36a powered by electricity from storage device 70, or as an electric power generator 36b that captures electric energy. In other operating conditions, the motor/generator may be passive such that it is not operating at all. In the depicted form, motor/generator 36 has a common rotor 37a and a common stator 37b, and is provided as an integrated unit; however in other embodiments a completely or partially separate motor, generator, rotor, stator, or the like may be employed. The designated motor/generator 36 is intended to encompass such variations. Furthermore it should be appreciated that in alternative embodiments of system 30 some of these features, such as air handling subsystem 50, aftertreatment equipment 60, and/or mechanical accessory drive 90 may be absent and/or other optional devices/subsystems may be included (not shown).

In certain embodiments the motor/generator 36 may comprise a hydraulic or pneumatic pump rather than an electric motor/generator. It shall be appreciated that references to a motor/generator herein are intended to encompass both electric motor/generators and non-electric motor/generators such as those comprising hydraulic or pneumatic pumps. Furthermore, power storage device 70 of system 30 may comprise one or more electrochemical batteries, supercapacitors or ultracapacitors, or may alternatively store energy in a different, non-electrical medium such as an accumulator found in a hydraulic or pneumatic hybrid system. It shall be appreciated that references to a battery herein are intended to encompass electrochemical storage batteries, other electrical storage devices such as capacitors, and non-electrical energy storage devices such as accumulators utilized in hydraulic or pneumatic hybrid systems.

In the illustrated embodiment, engine 32 is of a four-stroke, diesel-fueled, Compression Ignition (CI) type with multiple cylinders and corresponding reciprocating pistons coupled to crankshaft 33, which typically would be coupled to a flywheel. Crankshaft 33 is mechanically coupled to controllable clutch 34. Engine 32 may be of a conventional type with operation modifications to complement operation in system 30. In other embodiments, engine 32 may be of a different type, including different fueling, different operating cycle(s), different ignition, or the like.

Vehicle 20 further includes a controller 40 which may be configured to control various operational aspects of vehicle 20 and hybrid powertrain 22 as described in further detail herein. Controller 40 may be implemented in any of a number of ways. Controller 40 executes operating logic that defines various control, management, and/or regulation functions. This operating logic may be in the form of one or more microcontroller or microprocessor routines stored in a non-transitory memory, dedicated hardware, such as a hard-wired state machine, analog calculating machine, various types of programming instructions, and/or a different form as would occur to those skilled in the art.

Controller 40 may be provided as a single component, or a collection of operatively coupled components; and may comprise digital circuitry, analog circuitry, or a hybrid combination of both of these types. When of a multi-component form, controller 40 may have one or more components remotely located relative to the others in a distributed arrangement. Controller 40 can include multiple processing units arranged to operate independently, in a pipeline processing arrangement, in a parallel processing arrangement, or the like. In one embodiment, controller 40 includes several programmable microprocessing units of a solid-state, integrated circuit type that are disturbed throughout system 30 that each include one or more processing units and non-transitory memory. For the depicted embodiment, controller 40 includes a computer network interface to facilitate communications using standard Controller Area Network (CAN) communications or the like among various system control units. It should be appreciated that the depicted modules or other organizational units of controller 40 refer to certain operating logic performing indicated operations that may each be implemented in a physically separate controller of controller 40 and/or may be virtually implemented in the same controller.

The description herein including modules and/or organizational units emphasizes the structural independence of the aspects of the controller, and illustrates one grouping of operations and responsibilities of the controller. Other groupings that execute similar overall operations are understood within the scope of the present application. Modules and/or organizational units may be implemented in hardware and/or as computer instructions on a non-transient computer readable storage medium, and may be distributed across various hardware or computer based components.

Example and non-limiting implementation elements of modules and/or organizational units of the controller 40 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Controller 40 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

Controller 40 may be configured to perform a number of example control processes in which a total power and a power-split allocation can be determined and utilized in controlling one or more systems of hybrid powertrain 22 or vehicle 20. Controller 40 may be configured to implement unique methodologies and processes for controlling hybrid vehicles and hybrid powertrains, including basic vehicle control, power-split optimization and energy management, and hardware protection. In certain example embodiments, controller 40 may be configured to manage two principal quantities independently. The first managed quantity is the total power demanded of the powertrain (Pd) which may be determined, for example, using accelerator position, a throttle torque table, idle speed governor, PTO speed governor, cruise control governor, torque limiters, and any other information or criteria useful for engine and vehicle control.

The second managed quantity is the battery state of charge (SOC) which may be managed using a number of techniques including, for example, closed loop control, or open-loop scheduling. This SOC management may have multiple criteria or constraints including power limits due to battery temperature or cell voltages or protection from battery over-use. Or available battery energy might be depleted at minimum SOC, or unable to accept further charge at maximum SOC. SOC management might also be based on a fixed target steady-state SOC, or a variable target based on operating conditions. In one example, SOC is managed independent of Pd, and in such a way that it is possible to determine an instantaneous battery power (Pb) necessary to satisfy the SOC management criteria.

It shall be appreciated that references to determined, calculated, stored, or manipulated quantities expressed in units of power, such as Pd, Pb and other quantities disclosed herein, may also be expressed in units of torque, other units which correlate with power or torque, or dimensionless scales which correlate with power or torque. Various embodiments may utilize any of these various output units or combinations thereof.

For power-split, the electrical power allocation may be based upon Pb and the engine allocation may be based upon the remaining power (Pd−Pb). In certain instances one or more subsystems may be unable to achieve its allocated power due to a capacity or derate constraint. Reallocation may be performed under these conditions. Reallocation may be performed by applying boundary limits on one subsystem and recalculating the complementary devices allocation based on the known total. Further details of several example reallocation techniques are illustrated and described in connection with FIGS. 7-9.

Figure 2:
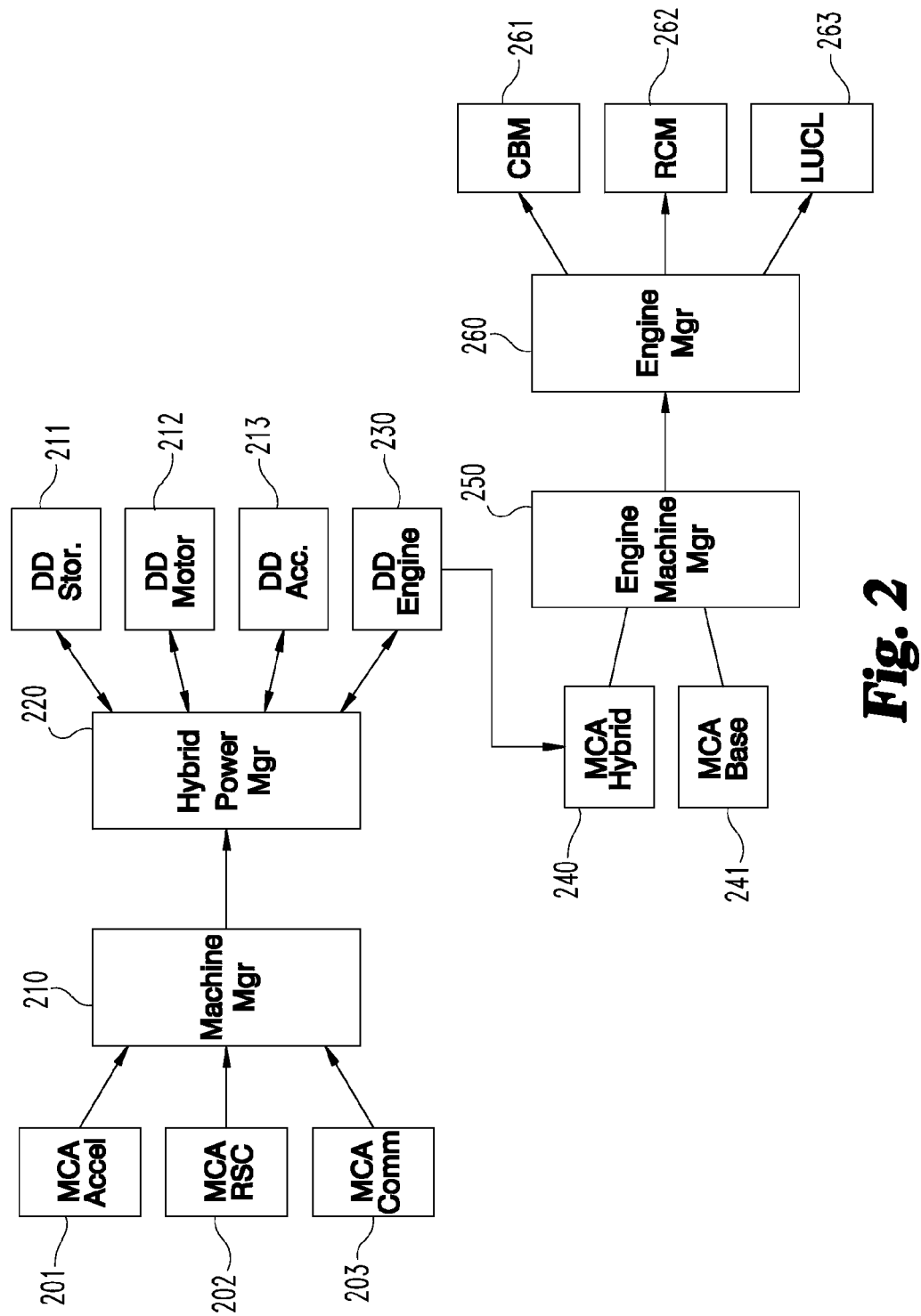
FIGS. 2-6 illustrate block diagrams of various aspects of several example control systems.

With reference to FIG. 2 there is illustrated a block diagram of an example control system 200 which may be implemented, for example, in any of the forms disclosed above in connection with controller 40. Control system 200 includes a machine manager 210 which receives inputs from machine control agent (MCA) 201, MCA 202, and MCA 203. MCA 201 provides accelerator position information to machine manager 210. MCA 202 provides road speed control information such as cruise control commands and/or road speed limits to machine manager 210. MCA 203 provides communication system information to machine manager 210, for example, an override command from a transmission which has temporarily assumed control and overridden the other machine control agents such as during a gear shift event. Based on the inputs received from MCAs 201, 202, and 203, machine manager 210 calculates a total power demanded of the powertrain (Pd) which is provided to hybrid power manager 220.

Hybrid power manager 220 is in communication with device drivers 211, 212, 213 and 230. Device driver 211 is a battery device driver which communicates one or more battery constraints to hybrid power manager 220. Device driver 212 is a motor/generator device driver which communicates one or more motor/generator constraints to hybrid power manager 220 and receives a battery power command from hybrid power manager 220. Device driver 213 is an accessory device driver which communicates one or more accessory constraints to hybrid power manager 220. Device driver 230 is an engine device driver which communicates one or more engine constraints to hybrid power manager 220 and receives a calculated engine power from hybrid power manager 220. Certain engine constraints may be determined by engine machine manager 250, for example, based upon an MCA base input 241, and then passed to device driver 230 using MCA 240.

In certain example embodiments hybrid power manager 220 is configured to perform the following power allocation operations:
  a) determine a battery power (Pb) based on a battery state of charge,
  b) calculate an engine power (Pe) as the difference between the total power demanded and the battery power (Pe=Pd−Pb)
  c) impose constraints on engine power (Pe) to determine a constrained engine power (Pe'),
  d) determine a recalculated battery power (Pb') as the difference between total power demanded and constrained engine power (Pb'=Pd−Pe'), and
  e) impose constraints on recalculated battery power (Pb') to determine a constrained recalculated battery power (Pb")

Constraints on battery power Pb may be constraints on the battery itself such as derates due to overtemperature, capability limits due to cold soak, constraints due to over or under charging, or constraints meant to extend battery life. Or battery power constraints may be due to a diminished ability to deliver or consume electrical power from the battery such as resulting from derates on the MG due to overtemperature in the electronics. Constraints on engine power Pe may be due to engine derates such as overtemperature or any other derate which would occur to one skilled in the art with the benefit of the present disclosure.

It shall be appreciated that the foregoing operations are but one example of operations that may be performed by hybrid power manager 220 and that additional and/or alternate operations such as those described below in connection with FIGS. 3-7 as well as combinations and variations thereof may be performed by hybrid power manager 220 in various embodiments. It shall be appreciated that a number of different processes disclosed herein allow multiple goals to be achieved concurrently. Total power demand can be met if feasible. Battery SOC can be managed and bound by the constraints of the electrical system. Regenerative braking power can be maximized. An optimal reserve of stored energy can be maintained. Battery usage can be managed so that battery life meets predetermined criteria. Efficiency can be optimized over the operating cycle, and efficiency can be determined in light of fuel economy, battery life usage, an emissions value output, operating margin to maintain responsiveness to a potential operator power/torque request, and/or any other criteria understood to one of skill in the art having the benefit of the disclosure herein. Each of multiple power sources can be kept within respective operating limits. A continuously changing mix of power sources can be accomplished smoothly. These are but a few non-limiting examples of operational goals which can be achieved using the example control techniques disclosed herein.

Hybrid power manager 220 is further configured to provide constrained recalculated battery power (Pb") to device driver 212 which utilizes Pb" to control a motor/generator to charge a battery or receive energy from a battery as well as controlling various other power electronics functions based upon Pb". Hybrid power manager 220 provides constrained engine power (Pe') to device driver 230. Device driver 230 provides Pe' to MCA 240 which then provides Pe' to engine machine manager 250. Engine machine manager 250 also receives input from MCA 241 which imposes constraints on engine operation ranging from a minimum idle speed, e.g. configured to prevent stall, to a maximum engine speed, e.g. configured to prevent damage to the engine. It should be appreciated that the value Pe' which is passed to engine machine manager 250 has previously been constrained, for example, as described above. Thus, in some embodiments no further constraint is effected. In other embodiments machine engine manager 250 repeats constraints previously imposed to determine Pe'. This may be beneficial in avoiding mathematical or rounding errors and accounting for data latency, and to prioritize certain limit types between the various power providers. Machine manager 250 passes Pe' to engine manager 260. Engine manager 260 calculates a fueling command which it passes to combustion manager 261 which schedules fueling. Engine manager 260 may also calculate an engine retarder command which it passes to retarder manager 262 to schedule engine braking. Engine manager 260 also calculates lubrication and coolant commands which it passes to lubrication and cooling manager 263.

Figure 3:
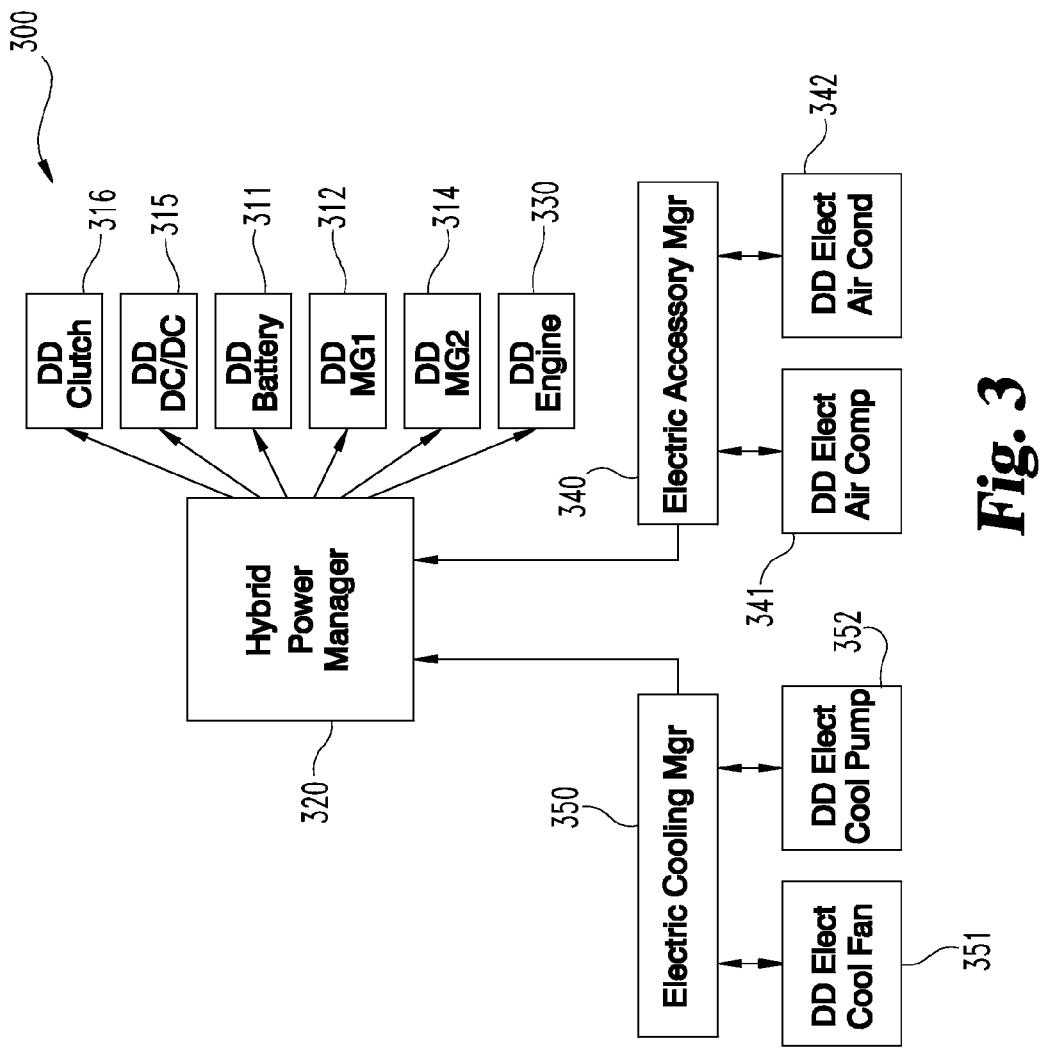

With reference to FIG. 3 there is illustrated a block diagram of an example control system 300 including hybrid power manager 320. Hybrid power manager 320 receives constraints from device drivers 311, 312, 314, 315, and 316. Device driver 311 is a battery device driver. Device driver 312 is a device driver for a first motor/generator. Device driver 314 is a driver for a second motor/generator. Device driver 315 is a driver for a DC/DC converter. Device driver 316 is a driver for a controllable clutch. Hybrid power manager 320 is also coupled to electric accessory manager 340 and electric cooling manager 350. Electric accessory manager 340 passes constraints to hybrid power manager relating to electrical accessories. Electric cooling manager 350 passes constraints to hybrid power manager 320 related to cooling system constraints. Electrical accessory manager 340 is connected to device drivers 341 and 342 which drive an electric air compressor and electric air conditioner respectively. Electric cooling manager 350 is connected to device drivers 351 and 352 which drive an electric cooling fan and an electric cooling pump respectively. Hybrid power manager 320 is operable to impose various constraints on engine power and/or battery power based upon input from the various device drivers.

Figure 4:
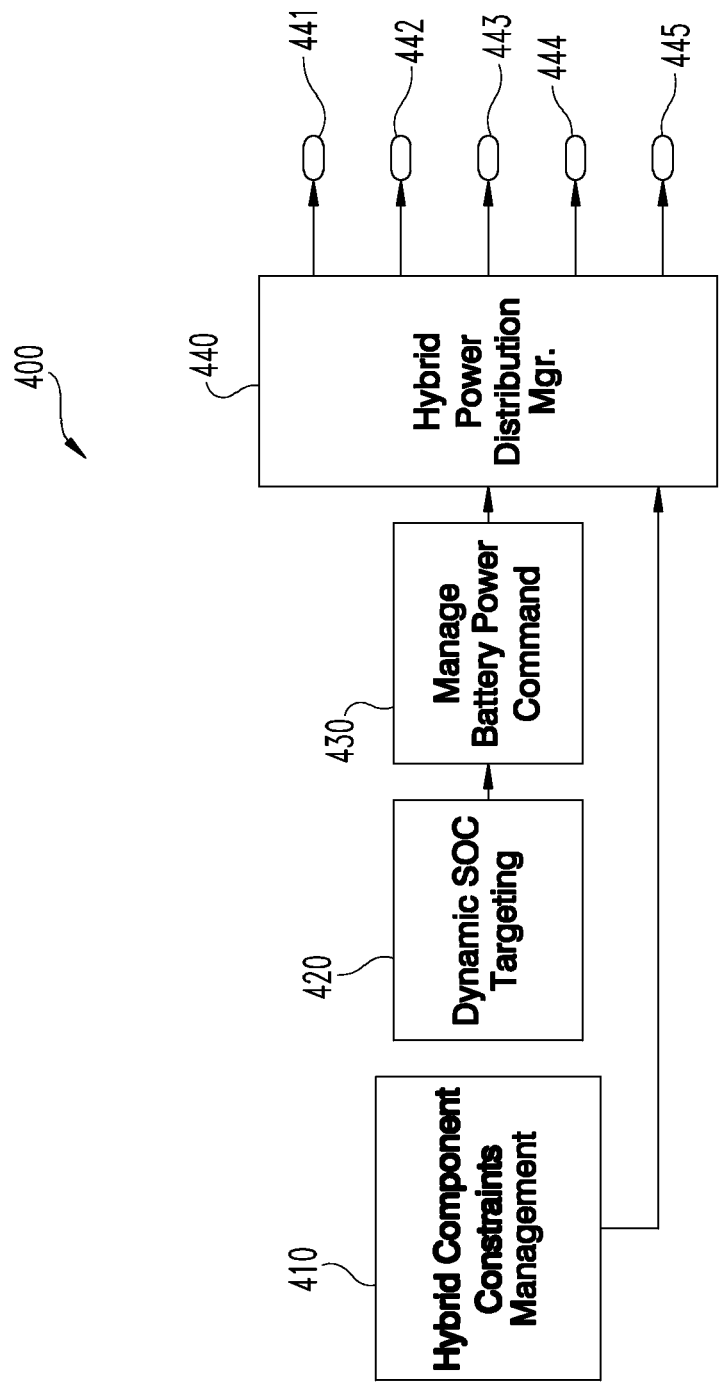

With reference to FIG. 4 there is illustrated a block diagram of an example control system 400 which may be implemented within hybrid power manager 220 described in connection with FIG. 2 or hybrid power manager 320 described in connection with FIG. 3. Control system 400 includes a component constraint manager 410 which collects these constraints from the various inputs to controls 400 and passes them to a power distribution manager 440. Control system 400 further includes dynamic state of charge targeting manager 420 which dynamically determines a target state of charge and passes the target state of charge to battery power command manager 430. Battery power command manager 430 calculates Pb based upon the dynamically determined state of charge. Further details of one example dynamic determination of state of charge are described below in connection with FIG. 5. Battery power command manager 430 calculates Pb based upon the dynamic state of charge and passes Pb to hybrid power distribution manager 440 which may be configured to perform one or more of the operations described above in connection with FIG. 2. Hybrid power distribution manager 440 provides engine power command output 441, first motor/generator power command output 442, second motor/generator power command output 443, and clutch command output 444.

It should be appreciated that a variety of constraints may be imposed by hybrid component constraint manager 410. These constraints include without limitation constraints on motor/generator operation, constraints on transmission operation, constraints on engine operation, constraints on battery operation, constraints on turbocharger speed, constraints on various system temperatures or pressures, as well as a number of other constraints, depending on the particularities of a particular system as would occur to one of skill in the art. These constraints may include so-called soft constraints, for example, operating modes or conditions which promote desired performance, efficiency, or other desired conditions. Such constraints are examples of negotiable constraints that may be subsequently modified or rejected by subsequent control operations. These constraints may also include so-called hard constraints which are not subject to further negotiation, for example, hard limits on engine or battery operation or conditions which protect against damage or other unacceptable conditions.

Figure 5:
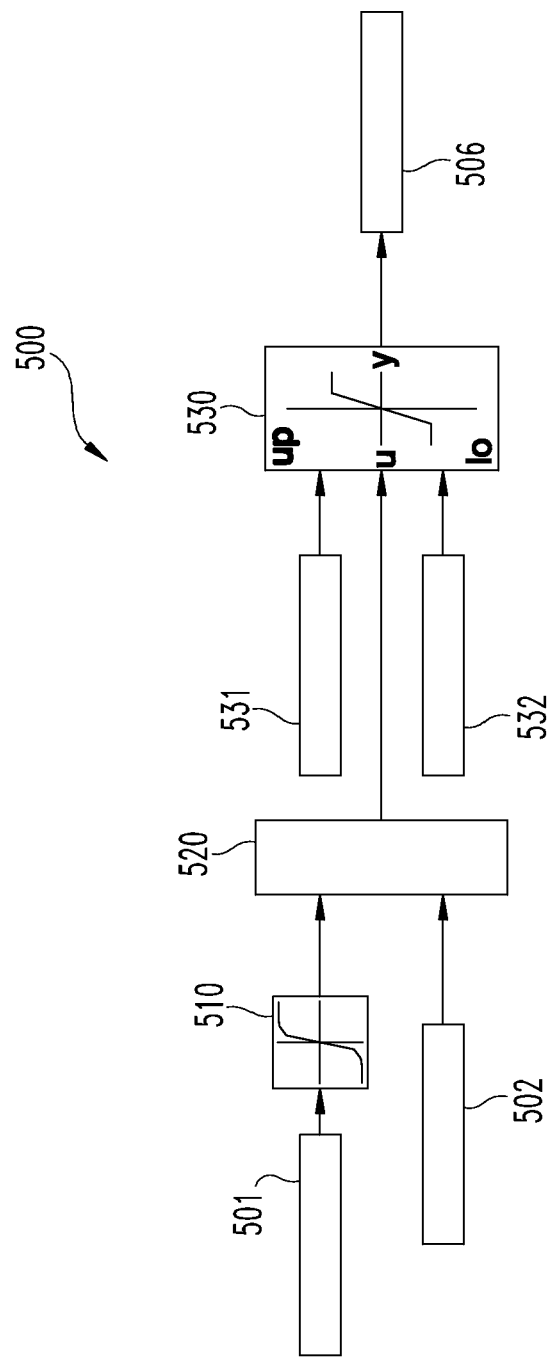

With reference to FIG. 5 there is illustrated a block diagram of an example control system 500. Control system 500 illustrates further details of one example dynamic state of charge target determination which may be implemented for example in dynamic state of charge targeting module 420 described above in connection with FIG. 4. Controls 500 provide vehicle speed information 501 to an offset function 510 which determines an offset for a base state of charge target as a function of vehicle speed. The offset determined by function 510 is provided to an input of operator 520. A base state of charge target 502 is also provided to operator 520. Operator 520 calculates dynamically determined state of charge target which is passed to operator 530. Operator 530 imposes upper and lower limits on the dynamically determined state of charge target based upon upper limit input 531 and lower limit input 532. The limited dynamically determined state of charge target is provided at output 506.

Figure 6:
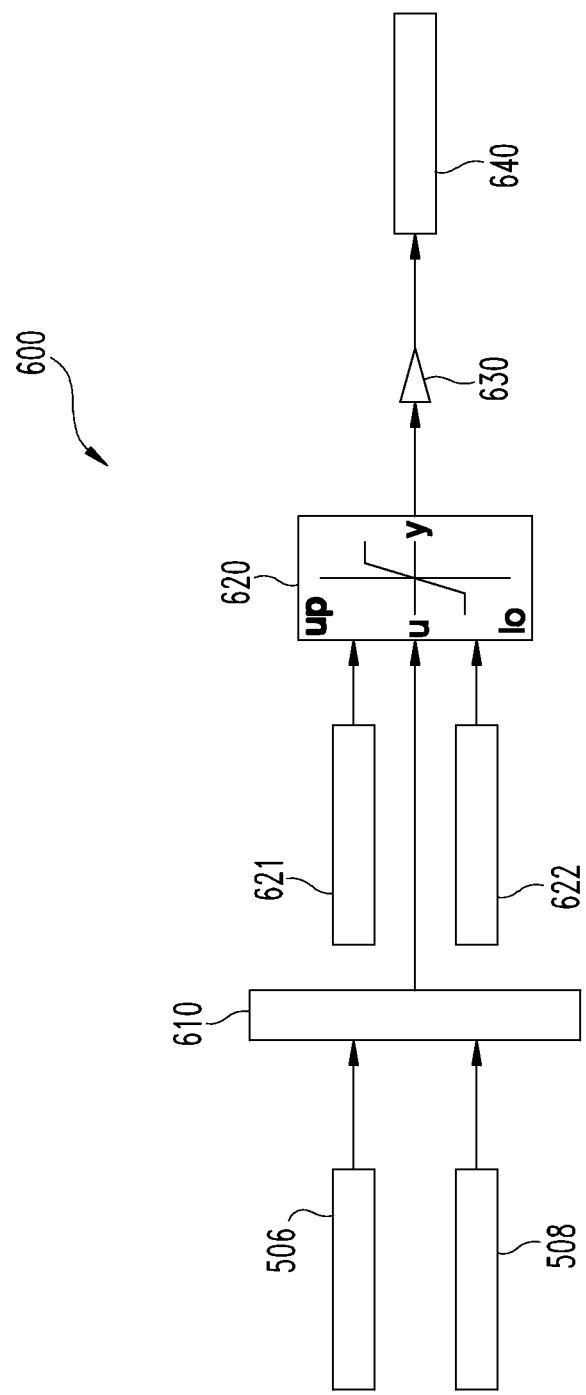

With reference to FIG. 6 there is illustrated a block diagram of an example control system 600 which may be implemented for example in battery power command manager 430 described above in connection with FIG. 4. Control system 600 includes an operator 610 which determines an error between the dynamically determined state of charge target 506 and actual state of charge information 508. In the illustrated embodiment control system 600 implements a proportional controller. It should be appreciated that other embodiments may utilize other types of controllers such as proportional integral (PI) controllers, proportional derivative (PD) controllers proportional integral derivative (PID) controllers to name a few examples. Control system 600 may be utilized to determine Pb. Operator 610 outputs the error which it determines to operator 620. Operator 620 imposes a dead zone upper limit based upon dead zone upper limit input 621 and also imposes a dead zone lower limit based upon dead zone lower limit input 622. The output of operator 620 is provided to operator 630 which is a gain function that relates the error to battery power. The output of operator 630 is provided to output 640. In one example, the use of the dead zone limit inputs 621, 622 improves efficiency by preventing the control loop from continuing to modulate the electronics for near zero power commands. In certain embodiments, the dead zone limit inputs 621, 622 may be replaced with hysteresis logic, switching timers, and/or be omitted completely.

Figure 7:
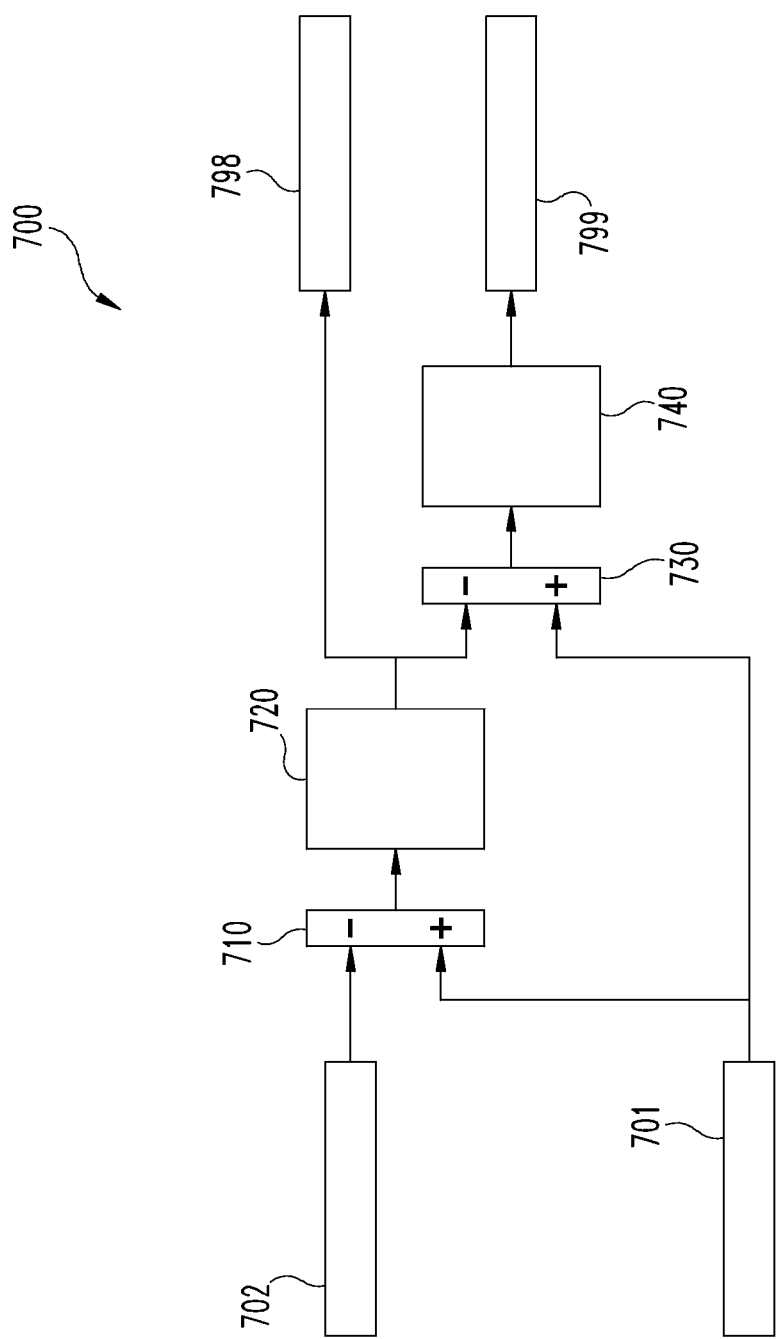
FIGS. 7-9 illustrate block diagrams of various aspects of several example control routines.

With reference to FIG. 7 there is illustrated a block diagram of an example control routine 700 which receives a total demanded power (Pd) at input 701 and a desired battery power (Pb) at input 702. Total demanded power (Pd) and desired battery power (Pb) may be determined using the techniques described above. Operator 710 calculates an engine power (Pe) based upon the difference of inputs 701 and 702 (Pe=Pd−Pb). Engine power (Pe) is provided to operator 720 which imposes one or more constraints on engine power (Pe) to determine a constrained engine power (Pe'). The one or more constraints may include the constraints and limits described above.

Constrained engine power (Pe') and total demanded power (Pd) are provided to operator 730 which determines a recalculated battery power (Pb') based on the difference between these inputs (Pb'=Pd−Pe'). Recalculated battery power (Pb') is provided to operator 740 which imposes one or more constraints on recalculated battery power (Pb') to determine a constrained battery power (Pb"). Constrained engine power (Pe') is provided to output 798 which may be used as a command or to determine a command for controlling engine operation. Constrained battery power (Pb') is provided to output 799 which may be used as a command or to determine a command for controlling operation of one or more motor/generators, DC/DC converters, battery systems, and/or other power electronics of a hybrid vehicle system.

Figure 8:
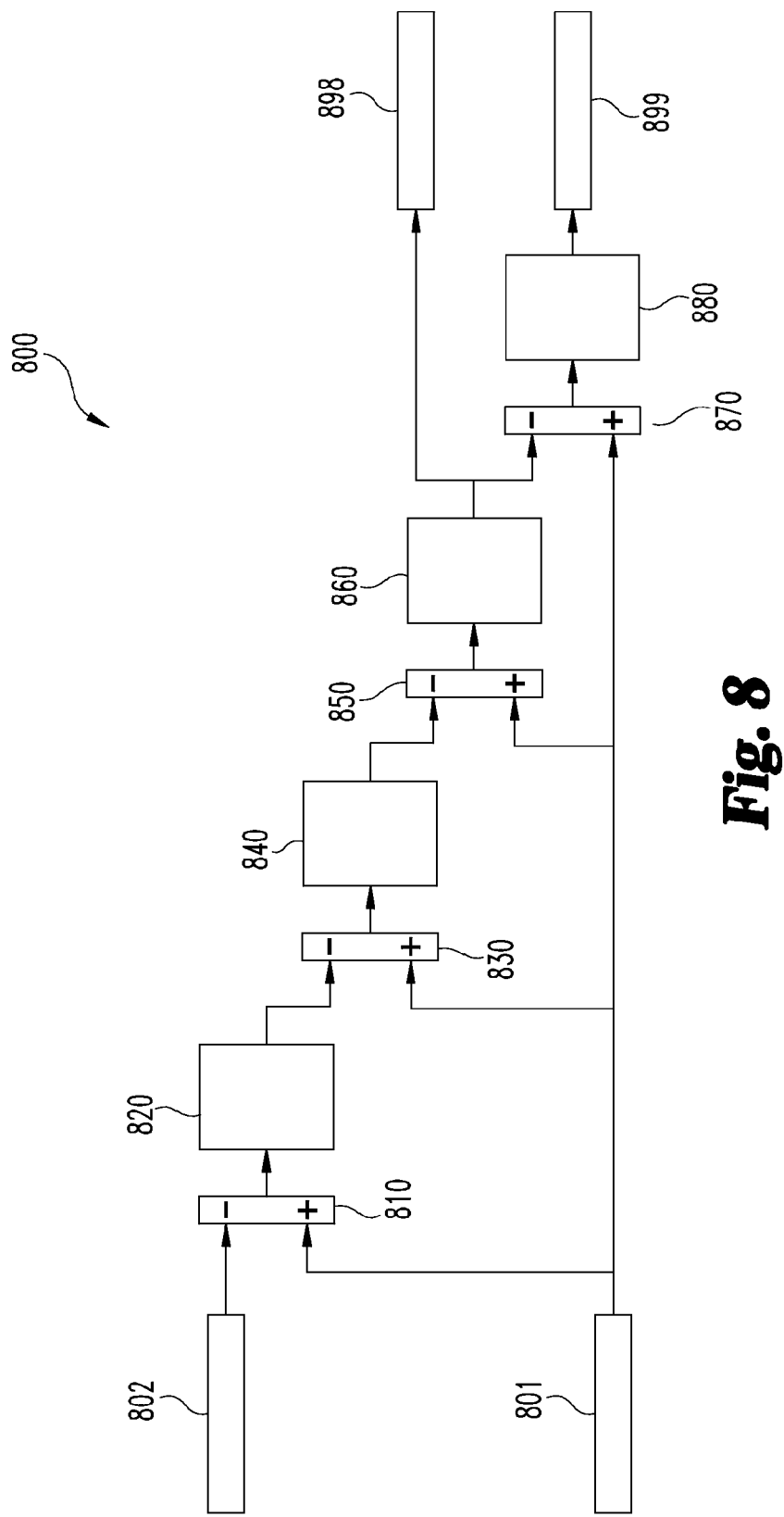

With reference to FIG. 8 there is illustrated a block diagram of an example control routine 800 which receives a total demanded power (Pd) at input 801 and a desired battery power (Pb) at input 802. Total demanded power (Pd) and desired battery power (Pb) may be determined using the techniques described above. Operator 810 calculates an engine power (Pe) based upon the difference of inputs 801 and 802 (Pe=Pd−Pb). Engine power (Pe) is provided to operator 820 which imposes one or more negotiable constraints on engine power (Pe) to determine a constrained engine power (Pe'). The one or more constraints may include the constraints and limits described above.

Constrained engine power (Pe') and total demanded power (Pd) are provided to operator 830 which determines a recalculated battery power (Pb') based on the difference between these inputs (Pb'=Pd−Pe'). Recalculated battery power (Pb') is provided to operator 840 which imposes one or more negotiable constraints on recalculated battery power (Pb') to provide a constrained battery power (Pb"). The one or more additional constraints may include the constraints and limits described above. Constrained battery power (Pb") is provided to operator 850 which determines a recalculated engine power (Pe") based upon Pd and Pb" (Pe"=Pd−Pb"). Recalculated engine power (Pe") is provided to operator 860 which imposes one or more additional hard constraints on recalculated engine power (Pe") to determine a constrained engine power (Pe'"). The one or more additional constraints may include the constraints and limits described above.

Constrained engine power (Pe'") is provided to operator 870 which determines a recalculated battery power (Pb'") based upon Pd and Pe'" (Pb'"=Pd−Pe'"). Recalculated battery power (Pb'") is provided to operator 880 which imposes one or more additional hard constraints on Pb'" to determine a constrained battery power (Pb""). The one or more additional constraints may include the constraints and limits described above. Constrained engine power (Pe'") is provided to output 898 which may be used as a command or to determine a command for controlling engine operation. Constrained battery power (Pb"") is provided to output 899 which may be used as a command or to determine a command for controlling operation of one or more motor/generators, DC/DC converters, battery systems, and/or other power electronics of a hybrid vehicle system. In this example, because the last reallocation based on negotiable constraints is performed after imposing battery constraints, it shall be appreciated that battery constraints will be favored when the system is over constrained.

Figure 9:
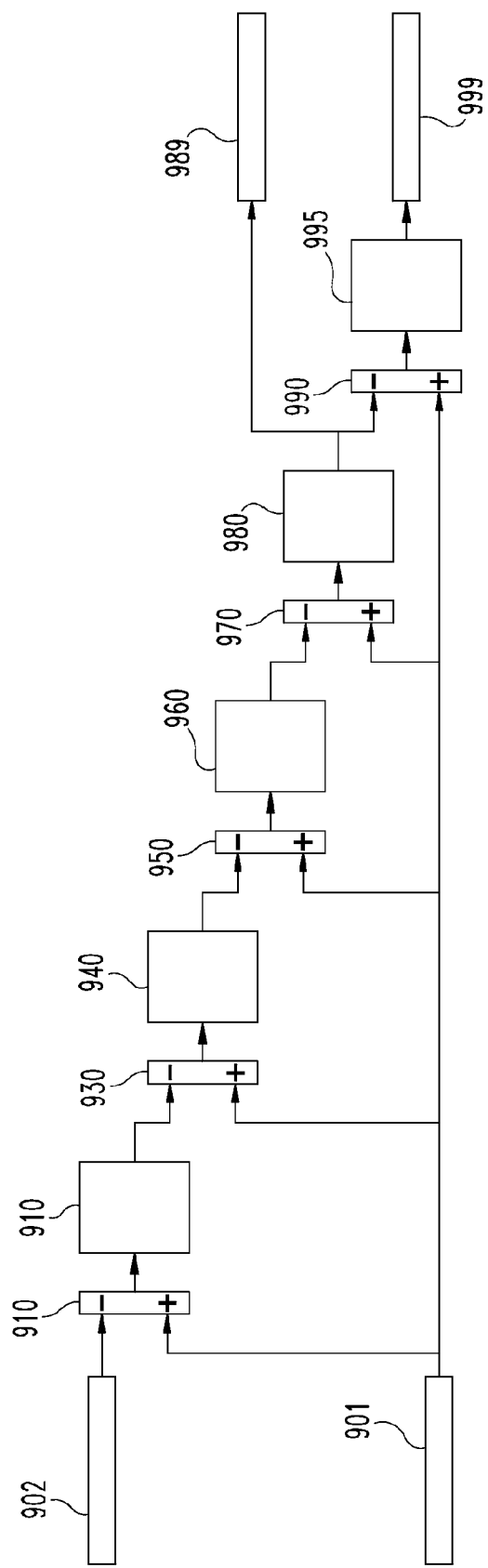

FIG. 9 presents an example system where engine constraints are favored when the system is over constrained with respect to negotiable constraints. With reference to FIG. 9 there is illustrated a block diagram of an example control routine 900 which receives a total demanded power (Pd) at input 901 and a desired battery power (Pb) at input 902. Total demanded power (Pd) and desired battery power (Pb) may be determined using the techniques described above. Operator 910 calculates an engine power (Pe) based upon the difference of inputs 901 and 902 (Pe=Pd−Pb). Engine power (Pe) is provided to operator 920 which imposes one or more constraints on engine power (Pe) to determine a constrained engine power (Pe'). The one or more constraints may include the constraints and limits described above.

Constrained engine power (Pe') and total demanded power (Pd) are provided to operator 930 which determines a recalculated battery power (Pb') based on the difference between these inputs (Pb'=Pd−Pe'). Recalculated battery power (Pb') is provided to operator 940 which imposes one or more constraints on recalculated battery power (Pb') to provide a constrained battery power (Pb"). The one or more constraints may include the constraints and limits described above. Constrained battery power (Pb") is provided to operator 950 which determines a recalculated engine power (Pe") based upon Pd and Pb"(Pe"=Pd−Pb"). Recalculated engine power (Pe") is provided to operator 960 which imposes one or more additional constraints on recalculated engine power (Pe") to determine a constrained engine power (Pe'"). The one or more additional constraints may include the constraints and limits described above.

Constrained engine power (Pe'") is provided to operator 970 which determines a recalculated battery power (Pb'") based upon Pd and Pe'" (Pb'"=Pd−Pe'"). Recalculated battery power (Pb'") is provided to operator 980 which imposes one or more additional constraints on Pb'" to determine a constrained battery power (Pb""). The one or more additional constraints may include the constraints and limits described above. Constrained battery power (Pb"") is provided to operator 990 which determines a recalculated engine power (Pe"") based upon Pd and Pb"" (Pe""=Pd−Pb"").

Recalculated engine power (Pe"") is provided to operator 995 which imposes one or more additional constraints on Pe"" to determine a constrained engine power (Pe""'). The one or more additional constraints may include the constraints and limits described above. Constrained engine power (Pe""') is provided to output 999 which may be used as a command or to determine a command for controlling engine operation. Constrained battery power (Pb"") is provided to output 998 which may be used as a command or to determine a command for controlling operation of one or more motor/generators, DC/DC converters, battery systems, and/or other power electronics of a hybrid vehicle system.

It shall be understood that the total constrained battery power in all example embodiments may not pertain to a single motor, but may represent the total electrical power provided by multiple MGs as would be found in a series-parallel electrical hybrid. In such an application, a further step of determining the power split between the multiple MGs would be necessary. Similarly, in such an application the constraints on battery power would include the combined constraints of the multiple MGs or associated power electronics.

A number of example embodiments have been described in detail. It shall be appreciated that certain example embodiments decouple power-split decision making from the driver demanded power. It shall be further appreciated that certain example embodiments provides a decision making hierarchy configured to meet driver-demand power while managing stored energy, energy distribution, and power source operating limits. In some forms a prioritized decision making algorithm may be implemented where top priority is to meet the driver-demand power while protecting the operating limits of the power plant hardware; lower-priority competing tasks include management of stored energy (including the total stored quantity, rationing the usage of stored energy for maximizing energy storage device life, making sure to capture all free energy, e.g. regenerative braking) and managing an optimal energy split between alternate power sources. The example embodiments disclose here may be implemented in a variety of forms and configuration to provide these and/or additional aspects of the embodiments disclosed herein.

It shall be understood that the example embodiments summarized and described in detail and illustrated in the figures are illustrative and not limiting or restrictive. Only certain example embodiments have been shown and described, and all changes and modifications that come within the scope of the invention are specifically contemplated herein, and are to be protected. It shall be appreciated that the embodiments and forms described above may be combined in certain instances and may be exclusive of one another in other instances. Likewise, it shall be appreciated that the embodiments and forms described above may or may not be combined with other aspects and features. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of controlling a hybrid electric vehicle powertrain, the method comprising:
    iteratively determining an engine output target and a battery output target with one or more electronic controllers the act of iteratively determining comprising operating the one or more controllers to determine:
        a total output demanded of the powertrain based at least in part upon an operator input,
        a first battery output target based upon a battery state of charge, independent of the operator input,
        a first engine output target based upon the total output demanded and the first battery output target,
        a second engine output target based upon the first engine output target and an engine constraint,
        a second battery output target based upon the total output demanded and the second engine output target, and
        a third battery output target based upon the second battery output target and a battery or motor/generator constraint; and
    operating the one or more electronic controllers to control an internal combustion engine using an engine control command constrained by the iterative determination of the first engine output target and the second engine output target and to control a motor/generator of the powertrain using a motor/generator command constrained by the iterative determination of the first battery output target, the second battery output target[s], and the third battery output target, and being effective to extend life of the battery.

2. The method of claim 1 further comprising determining with the one or more electronic controllers:
    third engine output target based upon the total output demanded and the third battery output target,
    a fourth engine output target based upon the third engine output target and a second engine constraint,
    a fourth battery output target based upon the total output demanded and the fourth engine output target, and
    a fifth battery output target based upon the fourth battery output target and a second battery constraint;
    wherein the engine control command is constrained by the iterative determination of the first, second, third and fourth engine output targets, and the motor/generator command is constrained by iterative determination of the first, second, third, fourth and fifth battery output targets.

3. The method of claim 2 wherein engine constraint is based upon a negotiable performance or efficiency criterion for the engine, and the battery constraint is based upon a negotiable performance or efficiency criterion for the battery or motor/generator.

4. The method of claim 2 wherein the second engine constraint is based upon a predetermined engine operating limit, and the second battery constraint is based upon a predetermined battery or motor/generator operating limit.

5. The method of claim 1 further comprising determining with the one or more electronic controllers:
    a third engine output target based upon the total output demanded and the third battery output target,
    a fourth engine output target based upon the third engine output target and a second engine constraint,
    a fourth battery output target based upon the total output demanded and the fourth engine output target,
    a fifth battery output target based upon the fourth battery output target and a second battery or motor/generator constraint,
    a fifth engine output target based upon the total output demanded and the fifth battery output target, and
    a sixth engine output target based upon the fifth engine output target and a third engine constraint;
    wherein the engine control command is constrained by the iterative determination of the first, second, third, fourth, fifth and sixth engine output targets, and the motor/generator command is constrained by iterative determination of the first, second, third, fourth and fifth battery output targets.

6. The method of claim 5 wherein the engine constraint and the second engine constraint are based upon a negotiable performance or efficiency criteria for the engine, and the battery constraint is based upon a negotiable performance or efficiency criterion for the battery or motor/generator.

7. The method of claim 5 wherein the third engine constraint is based upon a predetermined engine operating limit, and the second battery constraint is based upon a predetermined battery or motor/generator operating limit.

8. The method of claim 1 wherein the battery output target is determined based upon a vehicle speed and a state of charge target which varies based upon the vehicle speed.

9. The method of claim 1 wherein the total output demanded of the powertrain, the battery output target, the engine output target, the second engine output target, the second battery output target, and the third battery output target are calculated in units of power.

10. The method of claim 1 where the battery comprises an electrochemical storage medium and the motor/generator comprises an electric motor/generator.

11. A system for controlling a hybrid electric vehicle powertrain, the system comprising:
    one or more electronic control units configured to perform repeated calculations of a desired engine output and a desired battery output, the repeated calculations comprising:
        a total operational demand of the powertrain based at least in part upon a vehicle control device input,
        a first desired battery output based upon a battery state of charge and independent of the vehicle control device input,
        a first desired engine output based upon the total operational demand and the desired battery output,
        a second desired engine output based upon the desired engine output and an engine constraint,
        a second desired battery output based upon the total operational demand and the second desired engine output, and a third desired battery output based upon the second desired battery output and a battery or motor/generator constraint;

wherein the one or more electronic controllers are configured to control an internal combustion engine using an engine control command determined based upon the repeated calculation of the first desired engine output and the second desired engine output and to control a motor/generator using a motor/generator command determined based upon the repeated calculation of the first desired battery output, the second desired battery output, and the third desired battery output;

wherein the one or more electronic control units are further configured to perform calculations of:
 a third desired engine output based upon the total operational demand and the third desired battery output,
 a fourth desired engine output based upon the third desired engine output and a second engine constraint,
 a fourth desired battery output based upon the total operational demand and the fourth desired engine output, and
 a fifth desired battery output based upon the fourth desired battery output and a second battery or motor/generator constraint,
 a fifth desired engine output based upon the total operational demand and the fifth desired battery output, and
 a sixth desired engine output based upon the fifth desired engine output and a third engine constraint;

wherein the engine control command is determined based upon the repeated calculation of the first, second, third, fourth, fifth and sixth desired engine outputs and the motor/generator command is determined based upon the repeated calculation of the first, second, third, fourth and fifth desired battery outputs.

12. The system of claim 11 wherein the one or more electronic control units are further configured to perform calculations of:
 a third desired engine output based upon the total operational demand and the third desired battery output,
 a fourth desired engine output based upon the third desired engine output and a second engine constraint,
 a fourth desired battery output based upon the total operational demand and the fourth desired engine output, and
 a fifth desired battery output based upon the fourth desired battery output and a second battery or motor/generator constraint;

wherein the engine control command is determined based upon the repeated calculation of the first, second, third and fourth desired engine outputs and the motor/generator command is determined based upon the repeated calculation of the first, second, third, fourth and fifth desired battery outputs.

13. The system of claim 12 wherein the engine constraint and the battery or motor/generator constraint are based upon one or more non-mandatory desired performance or efficiency criteria.

14. The system of claim 12 wherein the second engine constraint and the second battery or motor/generator constraint are based upon one or more predetermined mandatory limits.

15. The system of claim 11 wherein the engine constraint, the second engine constraint, and the battery or motor/generator constraint are based upon one or more non-mandatory desired performance or efficiency criteria.

16. The system of claim 11 wherein the third engine and the second battery or motor/generator constraint are based upon one or more predetermined mandatory limits.

17. The system of claim 11 wherein the desired battery output is dynamically determined using a state of charge target which varies as a function of a speed of the vehicle and a current battery state of charge.

18. The system of claim 11 wherein the one or more electronic controllers are configured as a plurality of electronic control units.

19. The method of claim 11 where the battery comprises a hydraulic or pneumatic storage device and the motor/generator comprises a pump.

20. A method comprising:
 operating an electronic control system to perform the operations of:
 determining a total output demanded of a hybrid electric powertrain including an engine, a battery, and a motor/generator,
 determining a battery output target based upon a battery state of charge and independent of the total output demanded input,
 determining an engine output target based upon the total output demanded and the battery output target,
 providing a motor/generator command determined by a sequence of multiple constraints and recalculations of the battery output target effective to extend life of the battery, and an engine command determined by a sequence of multiple constraints and recalculations of the engine output target;
 controlling operation of a motor/generator of the powertrain based upon the battery command; and
 controlling operation of an engine of the powertrain based upon the engine command.

21. The method of claim 20 wherein the operation of providing a motor/generator command and an engine command comprises:
 determining a constrained engine output target based upon the engine output target and an engine constraint;
 determining a modified battery output target based upon the total output demanded and the constrained engine output target; and
 determining a constrained battery output target based upon the modified battery output target and a battery or motor/generator constraint.

22. The method of claim 21 wherein the constrained battery output target is used as the motor/generator command and the constrained engine output target is used as the engine command.

23. The method of claim 20 wherein the engine command and the motor/generator command are first constrained by non-mandatory constraints and second constrained by mandatory constraints.

24. The method of claim 23 wherein the operation of providing a motor/generator command and an engine command comprises:
 determining a soft constrained engine output target based upon the engine output target and one of said non-mandatory engine constraints;
 determining a modified battery output target based upon the total output demanded and the soft constrained engine output target;
 determining a soft constrained battery output target based upon the modified battery output target and another of said non-mandatory constraints;

determining a modified engine output target based upon the total output demanded and the soft constrained battery output target;

determining a hard constrained engine output target based upon the modified engine output target and one of said mandatory constraints;

determining a second modified battery output target based upon the total output demanded and the hard constrained engine output target, and determining a hard constrained battery output target based upon the second modified battery output target and another of said mandatory constraints.

25. The method of claim 24 wherein the hard constrained battery output target is used as the motor/generator command and the hard constrained engine output target is used as the engine power command.

26. The method of claim 20 wherein the engine power command and the battery power command are constrained by both a soft constraint and a hard constraint.

27. The method of claim 26 wherein the operation of providing a motor/generator command and an engine command comprises:

determining a soft constrained engine output target based upon the engine output target and a soft engine constraint;

determining a modified battery output target based upon the total output demanded and the soft constrained engine output target;

determining a soft constrained battery output target based upon the modified battery output target and a soft battery or motor/generator constraint;

determining a modified engine output target based upon the total output demanded and the soft constrained battery output target;

determining a second soft constrained engine output target based upon the modified engine output target and a second soft engine constraint;

determining a second modified battery output target based upon the total output demanded and the second soft constrained engine output target;

determining a hard constrained battery output target based upon the second modified battery output target and a hard battery or motor/generator constraint;

determining a second modified engine output target based upon the total output demanded and the hard constrained battery output target; and determining a hard constrained engine output target based upon the second modified engine target and a hard engine constraint.

28. The method of claim 27 wherein the hard constrained battery output target is used as the motor/generator command and the hard constrained engine output target is used as the engine command.

29. The method of claim 20 where the battery comprises an electrical storage battery and the motor/generator comprises an electric motor/generator.

30. The method of claim 20 where the battery comprises a hydraulic or pneumatic storage medium and the motor/generator comprises a pump.

31. The method of claim 20 where the providing a motor/generator command includes providing commands to control a plurality of motor/generators.

32. The method of claim 20 where the providing a motor/generator command includes providing a command to control a single motor/generator.

* * * * *